J. L. MAXWELL.
CHURN-DASHER.
No. 189,372. Patented April 10, 1877.
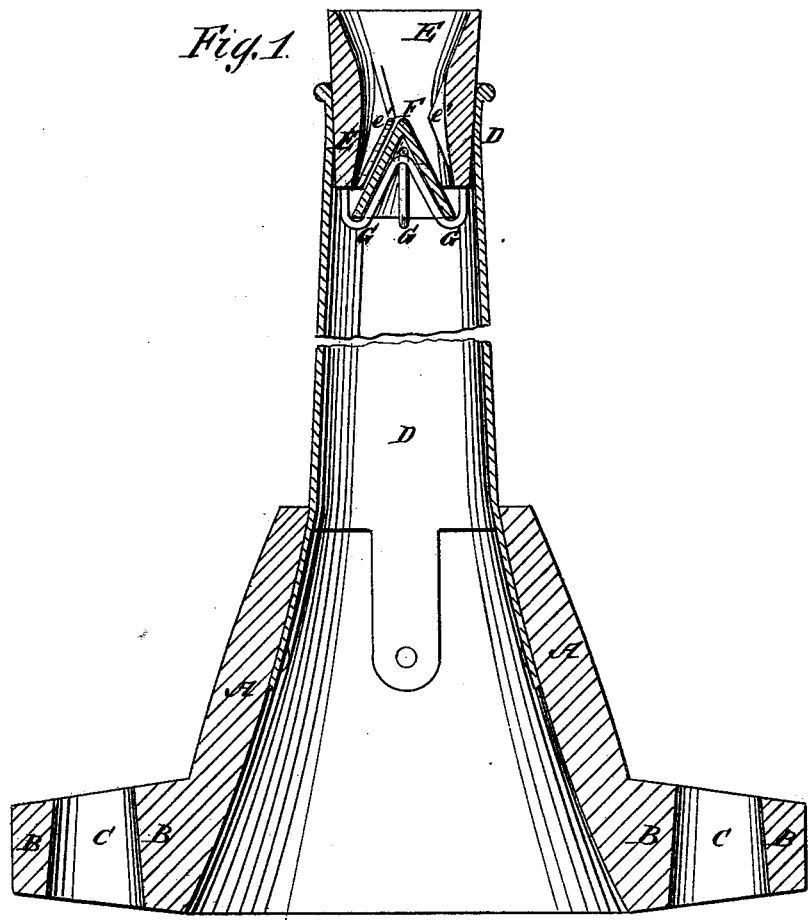
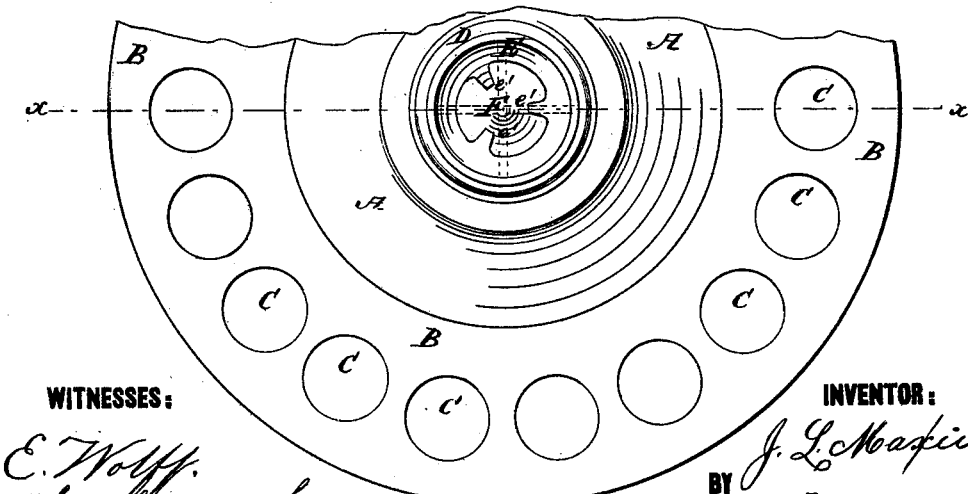
WITNESSES:
E. Wolff.
J H Scarborough.
INVENTOR:
J. L. Maxwell.
BY Munn & Co
ATTORNEYS.

UNITED STATES PATENT OFFICE.

JOHN L. MAXWELL, OF BENTONVILLE, ARKANSAS.

IMPROVEMENT IN CHURN-DASHERS.

Specification forming part of Letters Patent No. 189,372, dated April 10, 1877; application filed January 29, 1877.

*To all whom it may concern:*

Be it known that I, JOHN LIVINGSTON MAXWELL, of Bentonville, in the county of Benton and State of Arkansas, have invented a new and useful Improvement in Churn-Dasher, of which the following is a specification:

Figure 1 is a longitudinal section of my improved churn-dasher taken through the line $x\ x$, Fig. 2. Fig. 2 is a top view of the same.

Similar letters of reference indicate corresponding parts.

The object of this invention is to furnish an improved churn-dasher which shall be so constructed as to force air down into and through the milk as the dasher is moved up and down in the usual way, while at the same time producing a greater friction upon the milk, bringing the butter quicker and in greater quantity and of better quality than when an ordinary dasher is employed.

The invention will first be described in connection with the drawing, and then pointed out in the claim.

A is the dasher, which is made in the form of an inverted funnel, having a ring-flange, B, around its lower end. The flange B is tapered or slightly beveled upon both its upper and lower sides, as shown in Fig. 1. In the ring-flange B are formed a number of holes, C, which are tapered upward, as shown in Fig. 1. The bevel of the flange B throws the milk outward toward the sides of the churn as the dasher moves up and down, and the taper of the holes C produces a greater friction upon the milk as it is forced through them.

In the upper end of the funnel-shaped middle part A of the dasher is secured the lower end of the hollow handle D, which is made slightly tapering, and in the upper end of which is secured a tube, E. In the lower end of the tube E is formed a valve-seat, and upon the inner surface of its middle part are formed ribs $e'$, to center the valve as it moves to its seat.

F is the valve, which is made in the form of a hollow cone, and which is kept from dropping down too far by a cage or spider, G, secured to the lower end of the valve-tube E. The cage G is so formed as to fit into the cavity of the valve F, and thus keep it centered.

With this construction, as the dasher is raised, the tendency is to form a vacuum beneath it. This opens the valve F and draws air into the cavity of the handle D, and the cavity of the dasher A B. As the dasher is forced downward the valve F is closed, and the air is forced into and through the milk.

This introduction of air, and the peculiar form of the dasher, throws the milk into violent agitation, brings the butter very quickly, develops all the butter there may be in the milk, and produces a better quality of butter than when an ordinary dasher is used.

Having thus described my invention, I claim as new and desire to secure by Letters Patent—

The combination of the valve-tube E, provided with the guide-ribs $e'$, the hollow-cone valve F, and the cage or spider G, with the hollow handle D of the dasher A B C, substantially as herein shown and described.

JOHN LIVINGSTON MAXWELL.

Witnesses:
R. W. ELLIS,
E. S. McDANIEL.